US009656692B2

(12) United States Patent
Mildner et al.

(10) Patent No.: US 9,656,692 B2
(45) Date of Patent: May 23, 2017

(54) VEHICLE CHASSIS STRUCTURE

(71) Applicant: GM GLOBAL TECHNOLOGY OPERATIONS LLC, Detroit, MI (US)

(72) Inventors: Udo Mildner, Limburg (DE); Lothar Teske, Aschaffenburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/927,002

(22) Filed: Oct. 29, 2015

(65) Prior Publication Data
US 2016/0121928 A1 May 5, 2016

(30) Foreign Application Priority Data
Oct. 29, 2014 (DE) .................. 10 2014 016 045

(51) Int. Cl.
B60J 7/00 (2006.01)
B62D 21/00 (2006.01)
B62D 25/20 (2006.01)

(52) U.S. Cl.
CPC ............. *B62D 21/00* (2013.01); *B62D 25/20* (2013.01); *B62D 25/2018* (2013.01)

(58) Field of Classification Search
CPC G06F 1/20; G06F 1/187; B62D 21/02; G11B 33/142; B60G 2204/148; B21B 1/082; B29C 47/0009; B29C 47/38; B29C 47/6043; B29C 47/666
USPC ....................................... 296/204
See application file for complete search history.

(56) References Cited

U.S. PATENT DOCUMENTS

| | | | | |
|---|---|---|---|---|
| 2,226,790 A | * | 12/1940 | Valletta | B62D 21/10 280/785 |
| 2,788,223 A | * | 4/1957 | Mersheimer | B62D 21/10 280/783 |
| 3,419,303 A | * | 12/1968 | Eggert, Jr. | B62D 21/10 296/204 |
| 4,030,772 A | * | 6/1977 | Jacob | B62D 25/082 280/781 |
| 4,469,368 A | * | 9/1984 | Eger | B62D 25/082 180/89.1 |
| 4,712,829 A | * | 12/1987 | Hurten | B62D 25/082 296/203.02 |

(Continued)

FOREIGN PATENT DOCUMENTS

| | | |
|---|---|---|
| DE | 4300398 A1 | 7/1994 |
| DE | 19860032 A1 | 6/2000 |

(Continued)

OTHER PUBLICATIONS

German Patent Office, German Search Report for German Application No. 102014016045.9, dated Sep. 15, 2015.

*Primary Examiner* — Kiran B Patel
(74) *Attorney, Agent, or Firm* — Lorenz & Kopf LLP

(57) ABSTRACT

A side member of a vehicle chassis structure is disclosed as having a front section, two rear sections running on the same side of the vehicle center, and a branching section that connects the front and rear sections. The branching section includes a y-shaped floor part and at least one side wall part, which extends along an edge of the floor part, and encompasses both a side wall attached to a rising flange of the floor part and a flange angled away from the side wall and attached to a base plate of the floor part.

14 Claims, 3 Drawing Sheets

(56) References Cited

U.S. PATENT DOCUMENTS

| | | | |
|---|---|---|---|
| 5,002,333 A * | 3/1991 | Kenmochi | B62D 21/10 |
| | | | 296/204 |
| 5,112,102 A | 5/1992 | Wurl | |
| 5,346,276 A * | 9/1994 | Enning | B62D 25/082 |
| | | | 296/187.09 |
| 5,806,918 A * | 9/1998 | Kanazawa | B62D 21/07 |
| | | | 296/187.09 |
| 6,981,736 B2 * | 1/2006 | Morsch | B62D 25/2018 |
| | | | 296/187.03 |
| 7,559,402 B2 * | 7/2009 | Jennings | B62D 21/02 |
| | | | 180/232 |
| 8,556,336 B2 * | 10/2013 | Yasuhara | B62D 21/11 |
| | | | 296/193.07 |
| 8,585,133 B2 * | 11/2013 | Yasuhara | B62D 21/11 |
| | | | 296/187.09 |
| 8,636,314 B2 | 1/2014 | Mildner et al. | |
| 8,985,681 B2 * | 3/2015 | Fujii | B62D 25/2036 |
| | | | 296/204 |
| 2010/0117403 A1 * | 5/2010 | Kihara | B62D 25/082 |
| | | | 296/203.02 |
| 2011/0272971 A1 * | 11/2011 | Kihara | B62D 25/2018 |
| | | | 296/203.02 |
| 2012/0119544 A1 * | 5/2012 | Mildner | B62D 25/025 |
| | | | 296/193.07 |
| 2012/0153679 A1 * | 6/2012 | Yasuhara | B62D 21/152 |
| | | | 296/203.02 |
| 2015/0021952 A1 * | 1/2015 | Mildner | B62D 25/087 |
| | | | 296/187.08 |

FOREIGN PATENT DOCUMENTS

| | | |
|---|---|---|
| DE | 102012020865 A1 | 4/2014 |
| DE | 102012023787 A1 | 6/2014 |
| FR | 855002 A | 4/1940 |
| JP | H0481372 A | 3/1992 |
| JP | H10138950 A | 5/1998 |
| JP | 2008230460 A | 10/2008 |

* cited by examiner

VEHICLE CHASSIS STRUCTURE

CROSS-REFERENCE TO RELATED APPLICATION

This application claims priority to German Patent Application No. 102014016045.9, filed Oct. 29, 2014, which is incorporated herein by reference in its entirety.

TECHNICAL FIELD

The present disclosure pertains to a vehicle chassis structure with a side member having a front section, two rear sections running on the same side of the vehicle center, and a branching section that connects the front section and rear sections.

BACKGROUND

The branching section of a conventional chassis structure such as disclosed in U.S. Pat. No. 5,002,333. The branching section is realized as a single piece through deep drawing. Steels suitable for deep drawing generally have a low strength, so that a sufficient resistance against the loads arising during a vehicle collision can only be achieved for the chassis structure by a high wall thickness and correspondingly high weight of the branching section.

SUMMARY

In accordance with the present disclosure, a vehicle chassis structure of the kind indicated at the outset is provided that achieves a high load-bearing capacity at a lower weight. For example, in an embodiment of the present disclosure a vehicle chassis structure of the kind indicated at the outset is disclosed and further includes a branching section having a y-shaped floor part and at least one side wall part, which extends along an edge of the floor part, and encompasses both a side wall attached to a rising flange of the floor part and a flange angled away from the side wall and attached to a base plate of the floor part. Attaching the respective side wall and flange of the floor part or flange of the side wall part and the base plate of the floor part to each other doubles the material along an edge of the branching section, which imparts a high strength to the latter and makes it possible to reduce the wall thicknesses of the parts assembled into the branching section in comparison to the conventional one-part branching section, and in so doing decrease its weight, without any losses in strength.

The side wall parts can be roll formed. Roll forming can be performed using high-strength alloys that are not suitable for deep drawing. If the at least one side wall part consists of such a high-strength alloy, in particular a high-strength aluminum alloy, the wall thickness of the side wall part and/or the floor part can be further reduced, and additional weight can be economized in this way.

A second flange can be angled away along the upper edge of the lateral wall, so that other parts of the chassis structure can be attached thereto. These parts may include in particular a floor plate of a passenger compartment and/or a front wall that separates the passenger compartment from an engine compartment.

The roll forming part can extend along an edge of the floor part between connectors for the two rear sections of the side member. The roll forming part can also extend along one of the two edges of the floor part, which each join a connector for one of the rear sections with a connector for the front section.

Side wall parts as defined above are preferably provided on all three edges of the floor part. The front section of the side wall part that generally runs between an engine compartment and a front wheel well of the vehicle is preferably designed as a profile with a closed cross section. An inner of the two rear sections of the side member can border a transmission hump of the vehicle. This inner rear section is also preferably designed as a profile with a closed cross section.

The inner, rear section may include several parts, which are interconnected along flanges that extend in a longitudinal direction of the inner, rear section. If these flanges are designed so as to project from the cross section of the inner, rear section toward the sides, they can further serve to anchor other parts of the chassis structure thereto, in particular a floor plate of the passenger compartment. An outer of the two rear sections can exhibit a hat-shaped cross section, which is only enhanced to form a closed cross section by mounting the floor plate or another body part thereon.

The front section and rear sections of the side member can also be roll formed. Here as well, fabrication through roll forming makes it possible to use high-strength material, so that the required load-bearing capacity of the side member in the event of a collision can be achieved with a low weight.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
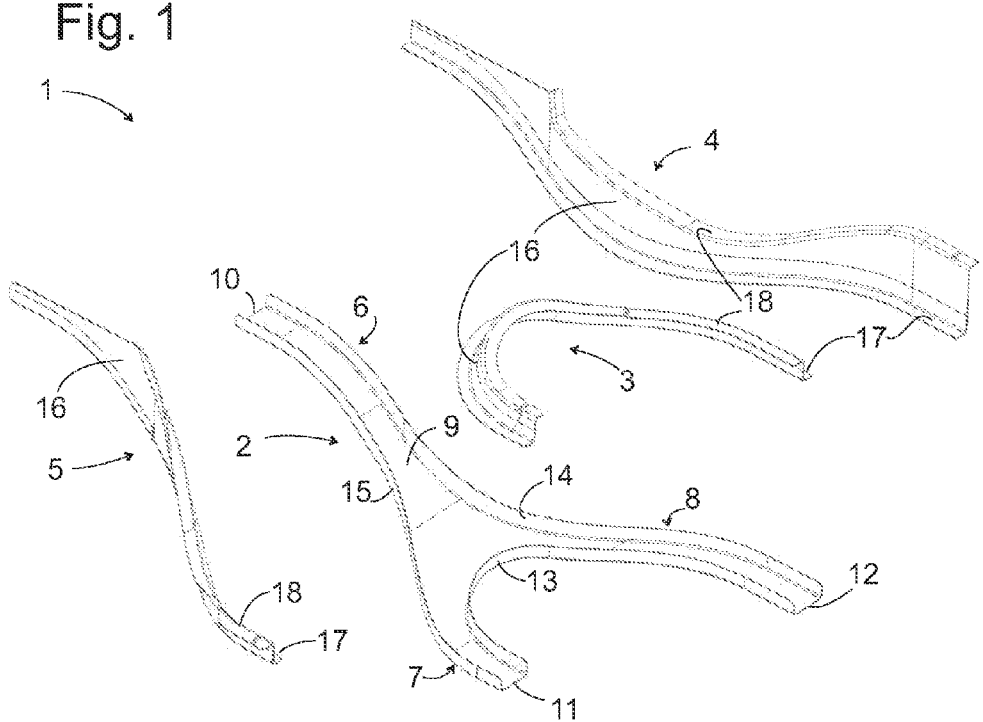
FIG. 1 illustrates the branching section of a vehicle chassis structure according to the present disclosure in an expanded view.

FIG. 1 shows the branching section 1 of a side member of a motor vehicle body in an expanded view. The branching section 1 includes a Y-shaped floor part 2 as viewed from above, and side wall parts 3, 4, 5. The floor part 2 is deep drawn in a manner known in the art from flat material, such as sheet steel. It encompasses three arms including a first arm 6 which extends obliquely upward toward the front in the longitudinal direction of the vehicle, and second and third arms 7, 8 which extend horizontally toward the back therein, and in so doing diverge in the transverse direction of the vehicle. A floor plate 9 extends over the entire length of the arms 6, 7, 8 up until the connectors 10, 11, 12 formed at their free ends. Formed along the edges of the floor plate 9 are vertically rising flanges 13, 14, 15, which each extend continuously from one of the connectors 10, 11, 12 to another.

The side wall parts 3, 4, 5 are roll formed out of high-strength sheet steel, and each encompass a vertical wall 16, as well as flanges 17, 18 angled away from the upper and lower edges of the wall 16 in opposite directions. The lower flange 17 and each of the flanges 13, 14, 15 extend over the entire length of the wall 16. The upper flange 18 of side wall part 3 also extends over the entire length of the wall 16. The upper flange 18 of the side wall parts 4, 5 extends from rear connectors 11, 12 but do not extend as far as to the front connector 10.

Figure 2:
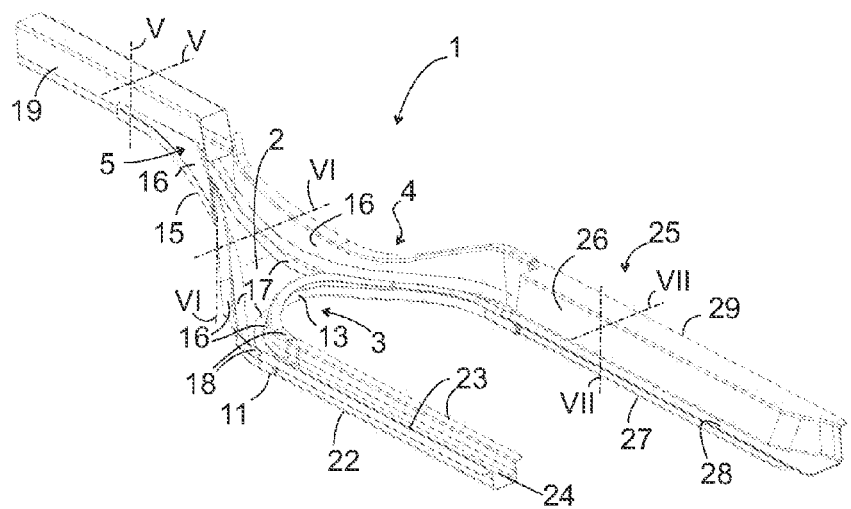
FIG. 2 illustrates the side member including the branching section on FIG. 1, front section and rear sections in an assembled condition.

When assembling the branching section 1, the floor part 2 and side wall parts 3, 4, 5 are each joined together in such a way that the lower flange 17 abuts against the floor plate 9, the wall 16 of the side wall part 3 abuts against the flange 13, the wall 16 of the side wall part 4 abuts against the flange 14, and the side wall 16 of the side wall part 5 abuts against the flange 15. These parts are structurally bonded by means of two rows of welding points, one along the side walls 16 and flanges 13, 14, 15 and the other along the flange 17 and floor plate 9. FIG. 2 shows a construction for the branching section 1 in which the side wall parts 3, 4, 5 are inserted into the floor part 2, so that the flanges 17 rest upon the floor plate 9. A configuration in which the side wall parts 3, 4, 5 of the floor part 2 envelop the floor part 2 from outside would also be possible.

The front connector 10 has placed inside of it a carrier section 19, here in the form of a rectangular profile. As evident from the cross section shown on FIG. 5, it is anchored on the areas of the walls 16 that rise over the flanges 14, 15 by means of welding points 20, and contacts the lower flanges 17 of the two side wall parts 4, 5. The welding points of the aforementioned rows connecting the side wall parts 3, 4, 5 with the floor part 2 are marked 21.

Figure 5:
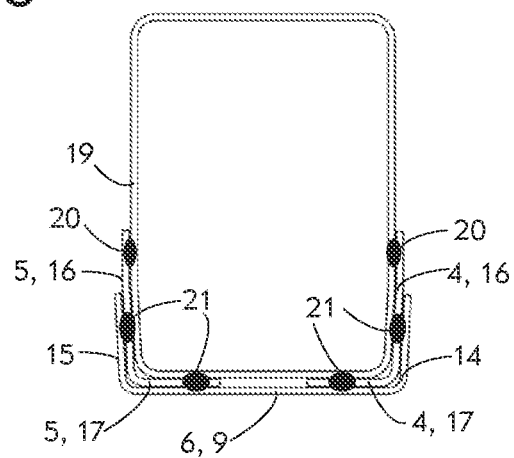
FIG. 5 is a cross section through the front section of a side member and the connector of the branching section that accommodates it along the V-V plane shown in FIG. 2.

The front carrier section 19 is depicted with a seamless cross section in FIG. 5. In practice, it is preferably obtained by roll forming a strip of high-strength sheet steel, wherein a seam on which the two edges of the sheet steel are welded together can be placed at any location of the cross section desired.

Figure 6:
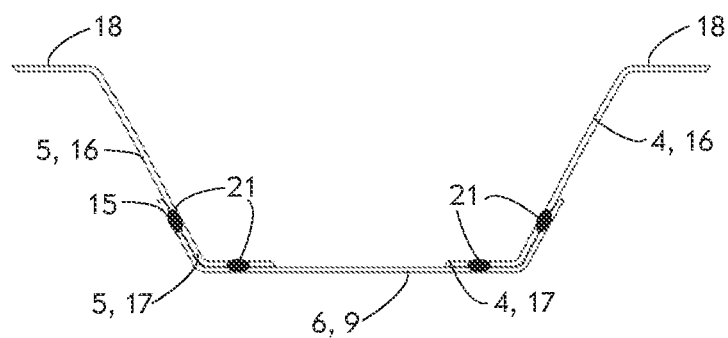
FIG. 6 is a cross section through the branching section along the VI-VI plane shown in FIG. 2.

FIG. 6 shows a section through a central area of the branching section 1 in the transverse direction of the vehicle. As clearly evident here, the material is doubled by overlapping the floor part 9 with the side wall parts 4, 5 in the area of the edges of the structure that is exposed to a heavy load during a collision, while the flat wall areas subjected to a weaker load can make do with a single sheet layer whose wall thickness can be distinctly smaller than that of a sheet deep drawn as a single part in a conventional manner.

Referring once again to FIG. 2, an outer, rear carrier section 22 is inserted into the connector 11, and welded to the side walls 16 and flanges 17, 18 of the side wall parts 3 and 5. The carrier section 22 has an inversely hat-shaped cross section with an upwardly open central groove 24, and upwardly facing, elongated flanges 23 on either side of the groove, which each extend and are provided as an elongation of the flange 18 of the side wall parts 3 and 5, so as to be welded from below to a floor plate of a passenger compartment (not shown on FIG. 2).

Figure 7:
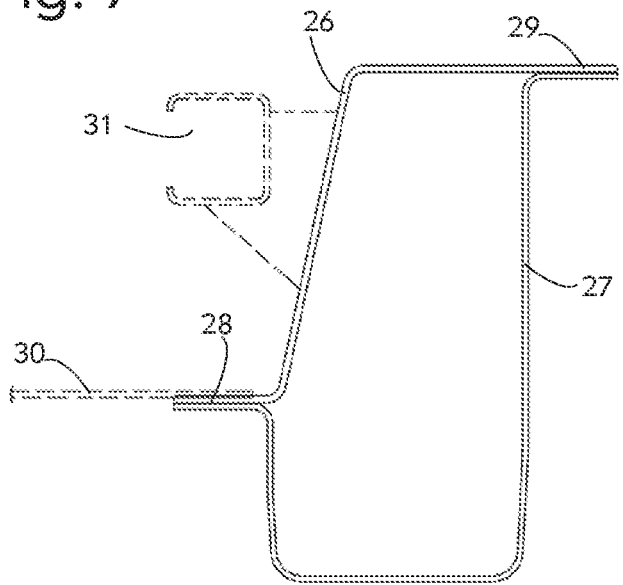
FIG. 7 is a cross section through the rear, inner section of the side member along the VII-VII plane shown in FIG. 2.

An inner, rear carrier section 25 is placed inside the connector 12, and there welded to the walls 16 and flanges 17, 18 of the side wall parts 3, 4. Just as the front carrier section 19, the carrier section 25 has a closed cross section, but as depicted on FIG. 7 is composed of several parts 26, 27, which are welded among each other along flanges 28 or 29 that extend in the longitudinal direction of the carrier section 25 or in the longitudinal direction of the vehicle. The flanges 28 protruding on the side facing the outer, rear carrier section 22 provide a support for the floor plate 30 of the passenger compartment. The flanges 29 protruding toward the middle of the vehicle can support a cover for a transmission hump or border an outlet opening for a gearshift extending into the transmission hump. The part 26 can serve as a carrier for a rail 31, in which a front seat of the vehicle is adjustably guided. Due to their simple shape, the parts 26, 27 can be easily fabricated via roll forming, and can therefore be made out of a high-strength material that is not suitable for deep drawing or extruding.

Figure 3:
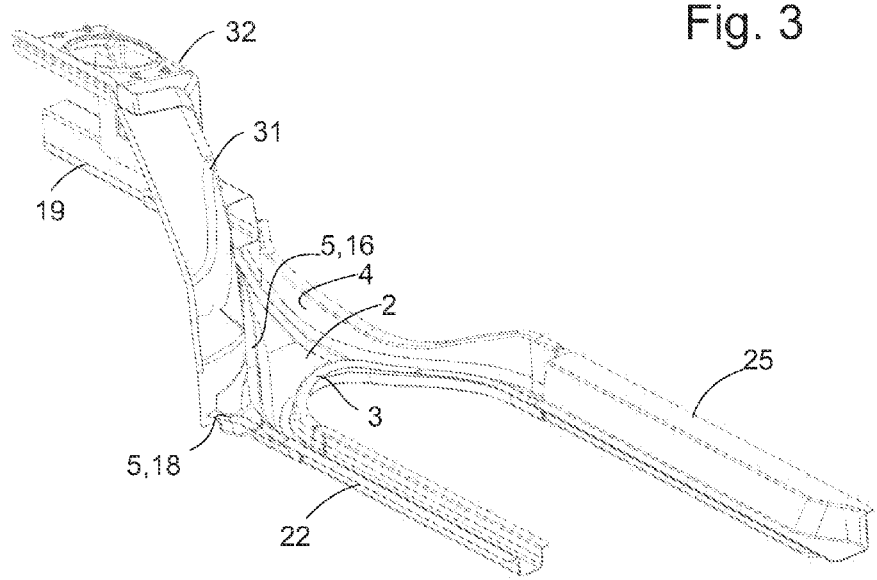
FIG. 3 illustrates the side member from FIG. 2, assembled with a front wheel housing.

FIG. 3 shows the side member from FIG. 2, enhanced to include a wheel housing 32 and a strut mount 33, which each include parts of a front wheel well. The wheel housing 32 is welded to the wall 16 of the side wall part 5 before the front end of its upper flange 18.

Figure 4:
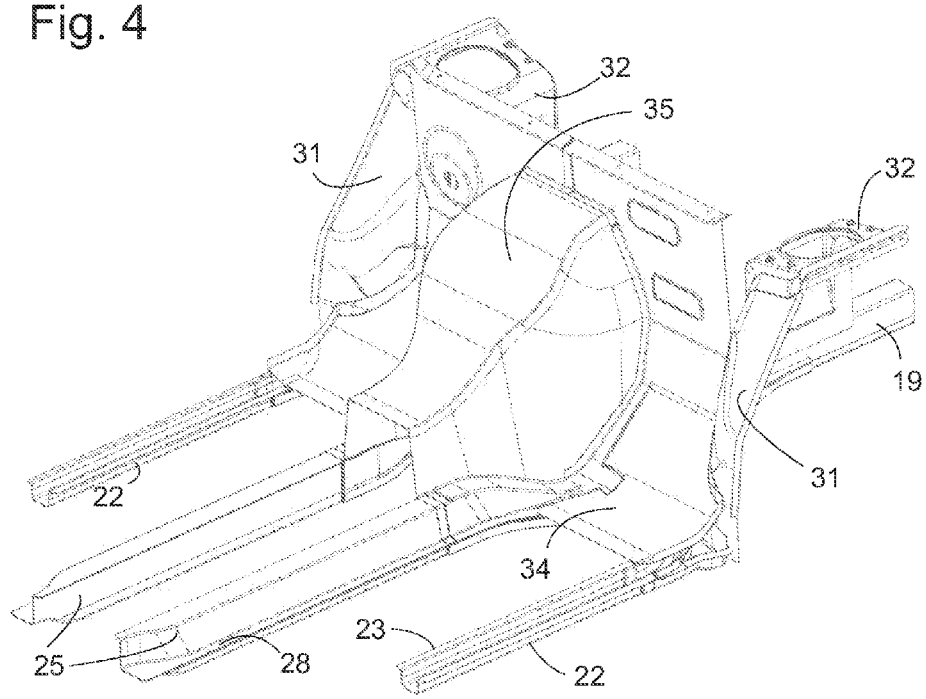
FIG. 4 is illustrates a complete front section with two side members on either side of the middle of the vehicle.

FIG. 4 shows the left-side assembly from FIG. 3 and a right-side assembly, which is a mirror-imaged counter piece, joined together by a front wall 34 that differentiates a passenger compartment from the engine compartment and a transmission hump front part 35, which projects into the passenger compartment from the front wall 34. A lower edge of the front wall 34 abuts flush against the flange 23 and 28 of the rear carrier sections 22, 25, on which the floor plate 30 not shown on FIG. 4 rests.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle chassis structure comprising a side member running on a first side with respect to a chassis centerline, the side member including a front section, a rear section having an inner rear section and an outer rear, and a branching section connecting the front and rear section, wherein the branching section includes a y-shaped floor part and at least one side wall part extending along an edge of the floor part, wherein each side wall part includes a side wall attached to a rising flange formed on the floor part and a first side wall flange angled away from the side wall and attached to a base plate of the floor part.

2. The vehicle chassis structure according to claim 1, wherein the at least one side wall part comprises a roll firmed part.

3. The vehicle chassis structure according to claim 1, wherein the at least one side wall pact comprises a high-strength alloy part.

4. The vehicle chassis structure according to claim 1, wherein the side wall of the side wall part rises up over an upper edge of the flange of the floor part.

5. The vehicle chassis structure according to claim 1, wherein the side wall part further comprises a second flange is angled away along an edge of the side wall opposite the first side wall flange.

6. The vehicle chassis structure according to claim 5, wherein in which the second flange is attached to a floor plate and/or a front wall of a passenger compartment.

7. The vehicle chassis structure according to claim 1, wherein the floor part further comprises an inner rear connector formed at an end of the inner rear section and an outer rear connector formed at an end of the outer rear section, wherein the side wall part extends along an edge of the floor part between the inner rear connector and the outer rear connector.

8. The vehicle chassis structure according to claim 1 wherein the floor part further comprises a front connector formed at an end of the front section and a rear connector formed at an end of one of the inner and outer rear sections, wherein the side wall part extends along an edge of the floor part between the front connector and the rear connector.

9. The vehicle chassis structure according to claim 1, wherein the front section comprises a structural member having a closed cross section.

10. The vehicle chassis structure according to claim 1, further comprising a transmission hump extending along the chassis centerline, wherein the rear inner section borders the transmission hump.

11. The vehicle chassis structure according to claim 10, wherein the inner rear section comprises a structural member having a closed cross section.

12. The vehicle chassis structure according to claim 10, wherein inner rear section comprises a plurality of structural parts interconnected along flanges that extend in a longitudinal direction of the inner rear section.

13. The vehicle chassis structure according to claim 1, wherein the outer rear sections comprises a structural member having a -shaped cross section.

14. The vehicle chassis structure according to claim 1, wherein least one of the front section, the inner rear section and the outer rear section comprises a roll formed structural member.

* * * * *